United States Patent [19]
Rowley

[11] 3,788,735
[45] Jan. 29, 1974

[54] REAR-VIEW MIRROR SYSTEM

[76] Inventor: David S. Rowley, 2350 Berkeley St., Salt Lake City, Utah 84109

[22] Filed: May 22, 1972

[21] Appl. No.: 255,699

[52] U.S. Cl................ 350/302, 350/299, 350/301, 350/293
[51] Int. Cl. .......................................... G02b 5/08
[58] Field of Search ... 350/288, 305, 302, 307, 293, 350/294, 299

[56] References Cited
UNITED STATES PATENTS

| | | | |
|---|---|---|---|
| 2,085,000 | 6/1937 | Borba et al. | 350/302 |
| 2,197,280 | 4/1940 | Topping | 350/301 |
| 2,942,522 | 6/1960 | Merriam | 350/302 |
| 2,221,449 | 11/1940 | Hoeninghausen | 350/293 |
| 3,498,697 | 3/1970 | Matteo | 350/302 |
| 1,798,837 | 2/1930 | Greensfelder | 350/293 |
| 3,463,578 | 8/1969 | Smith | 350/302 |
| 2,257,510 | 9/1941 | Mote | 350/293 |

*Primary Examiner*—David Schonberg
*Assistant Examiner*—Michael J. Tokar
*Attorney, Agent, or Firm*—Bernard Kriegel

[57] ABSTRACT

Rear-view mirror system for use in a vehicle, e.g. an automobile, comprising in combination with a conventional adjustable plane rear-view mirror, an additional pair of mirrors, one of such additional mirrors being a plane mirror which faces forward, and the second additional mirror being a spherical segment facing the rear, and mounted on the roof of the automobile, a glass window being mounted in an opening in the roof of the automobile, whereby the driver may tilt his conventional rear-view mirror upward to thus view the exterior spherical mirror by reflection from the first planar additional mirror, so as to provide a wide angle view to the rear of the vehicle without having to move the eye to any greater extent than when employing a conventional rear-view mirror.

26 Claims, 7 Drawing Figures

REAR-VIEW MIRROR SYSTEM

This invention relates to a rear-view mirror system for vehicles, particularly automobiles, and is especially designed to provide a wide angle view to the rear and sides of an automobile.

Conventional rear-view mirrors mounted in vehicles provide a relatively narrow angle of rear-view vision through the rear window, and accordingly have a large blind angle on both sides of the vehicle beyond the limited angle of view through the rear window on both sides of the vehicle.

Various systems have been proposed in the prior art in an effort to solve this problem. However, most of these systems still result in a restricted field of view to the rear, without permitting the driver to view into the blind spots left and right of the driver. Illustrative systems providing only a restricted rear view are for example those disclosed in U.S. Pat. Nos. 2,085,000; 2,252,161; and 2,569,576. Many of these systems also are relatively complex periscope-like devices, employing lens systems, and some of the prior art devices such as that disclosed in 2,569,576 are both complex and expensive.

Thus, as previously noted, the main defect of the prior art devices is that they do not provide the driver with the two essential elements of a successful system at the same time, namely: the rear view is not at the same time wide angle, and seen in a single image display within the field of view of the driver's eye, without moving the eye to "survey" the image presented. The prior art, as illustrated above, has attempted to accomplish these important criteria, but has failed to do so. Thus, in U.S. Pat. No. 3,498,697 although the patent shows obtention of a wide angle view employing such system, since the forward mirror surface of the system of this patent extends across the entire width of the vehicle, it would be necessary for the driver to move his eyes back and forth to scan the forward mirror surface in order to obtain information about the view to the rear. This has the fatal disadvantage that making the driver move his eyes and swivel his head from side to side in order to obtain the entire rear view through the mirror, detracts from the driver's capability in devoting his attention to the traffic and the road ahead. Thus, it is of particular importance that a successful rear-view system give the driver more information and greater safety without requiring him to do other things which would reduce or impair his ability to operate the vehicle.

Accordingly, it is a particular object of the present invention to provide an unobstructed single image view to the rear and sides of a vehicle, preferably including at least 100° field of view. Other objects of the invention are to eliminate driver blind spots normally occurring at the left and right quarters of the driver's vehicle; to provide the operator with the above-noted wide angle view to the rear so as to provide a greater amount of information about the condition of the road to the sides and to the rear, without requiring additional driver time, energy or fatigue; to provide a practical and relatively inexpensive means or device for obtaining an over-the-top 100° field of view to the rear and sides of the vehicle, and which can be installed on a vehicle at the time of manufacture; to provide a dependable and simple optical-mechanical viewing system of the above characteristics, which is reliable and relatively trouble free; to permit employment of the existing adjustable rear view mirror as an integral part of the viewing system and to permit bypassing of the wide angle viewing system and return to use of the ordinary rear-view mirror as desired, e.g. for reasons of weather, damage, or the like.

The above objects are achieved according to the present invention by the provision of a rear-view mirror system for use in vehicles, particularly a passenger automobile, wherein an additional pair of mirrors is provided, in combination with the conventional plane rear-view mirror, so that the driver may tilt such conventional mirror upward to thus view an exterior spherical mirror mounted on the roof of the vehicle, comprising one of such additional mirrors, to provide a wider field of vision to the rear. Thus, the invention system employs a conventional plane rear-view mirror, together with a second planar mirror, which faces forward toward the above conventional rear-view mirror, and a third mirror in the form of a spherical segment, which is mounted on the top of the vehicle. The second and third mirrors preferably are progressively larger in area so as to fill the field of view in the regular rear-view mirror.

All three mirrors of the invention system preferably are mounted approximately on the center line of the vehicle, the driver being located to the left of such center line, both the second and third mirrors preferably being adjustable as desired, and as described in greater detail below, although if desired, such second and third mirrors can be fixed, that is non-adjustable. A glass window is mounted in an opening in the roof of the vehicle to pass reflected rays from the spherical segment mirror to the second planar mirror, and thence forward to the conventional rear-view mirror. Such glass window is sealed to prevent dirt and weather from entering the vehicle from the outside.

The first and second plane adjustable mirror group, together with the spherical mirror segment on the roof, provide at least a 100° wide field of view over the top of the vehicle to the rear thereof at the left and right of the drive, including an at least 50° wide view on each side of the center line, at a single glance in the conventional first plane mirror. This eliminates blind spots to the left and right of the vehicle with no more additional effort in viewing this wide angle scene on the part of the driver, than would ordinarily be required in the driver's glancing through the conventional plane rear-view mirror. Further, the device of the invention is relatively simple and inexpensive, and can be installed readily on vehicles in use, as well as new vehicles at the factory. The invention system has the additional virtue that simply by tilting the conventional rear-view mirror of the system downward, one can view directly through the rear window as in conventional practice.

The invention will be more clearly understood by reference to the description below of a preferred embodiment, taken in connection with the accompanying drawing wherein:

FIG. 1 illustrates the rear-view mirror system of the invention installed in a passenger automobile;

Referring to FIG. 1 of the drawing, the mirror system of the invention comprises three mirrors 10, 12 and 14 operatively mounted in a conventional passenger vehicle or auto, indicated at 16. Mirrors 10 and 12 are each plane mirrors which are positioned within the vehicle, mirror 10 being a conventional rear-view mirror and mirror 12 being suspended from the roof 17 of the auto in the driver's compartment, and mirror 14 is a spherical mirror which is mounted on the roof 17 of the auto.

Figures 2, 4:
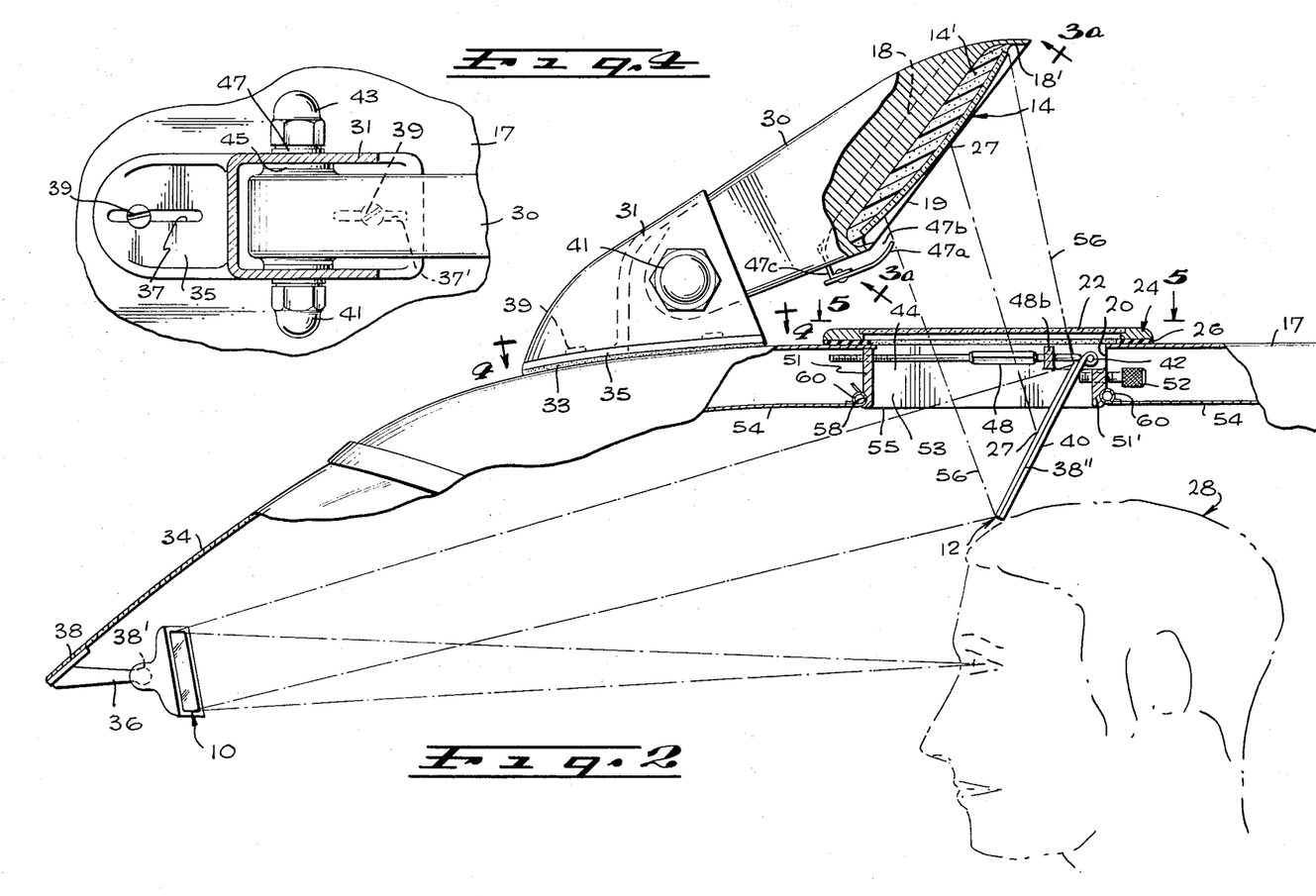
FIG. 2 is a detailed illustration of the mirror system of FIG. 1.
FIG. 4 is a partial sectional view taken on line 4—4 of FIG. 2, showing the structure for attachment of the top mounted mirror to the auto roof.
Figure 5:
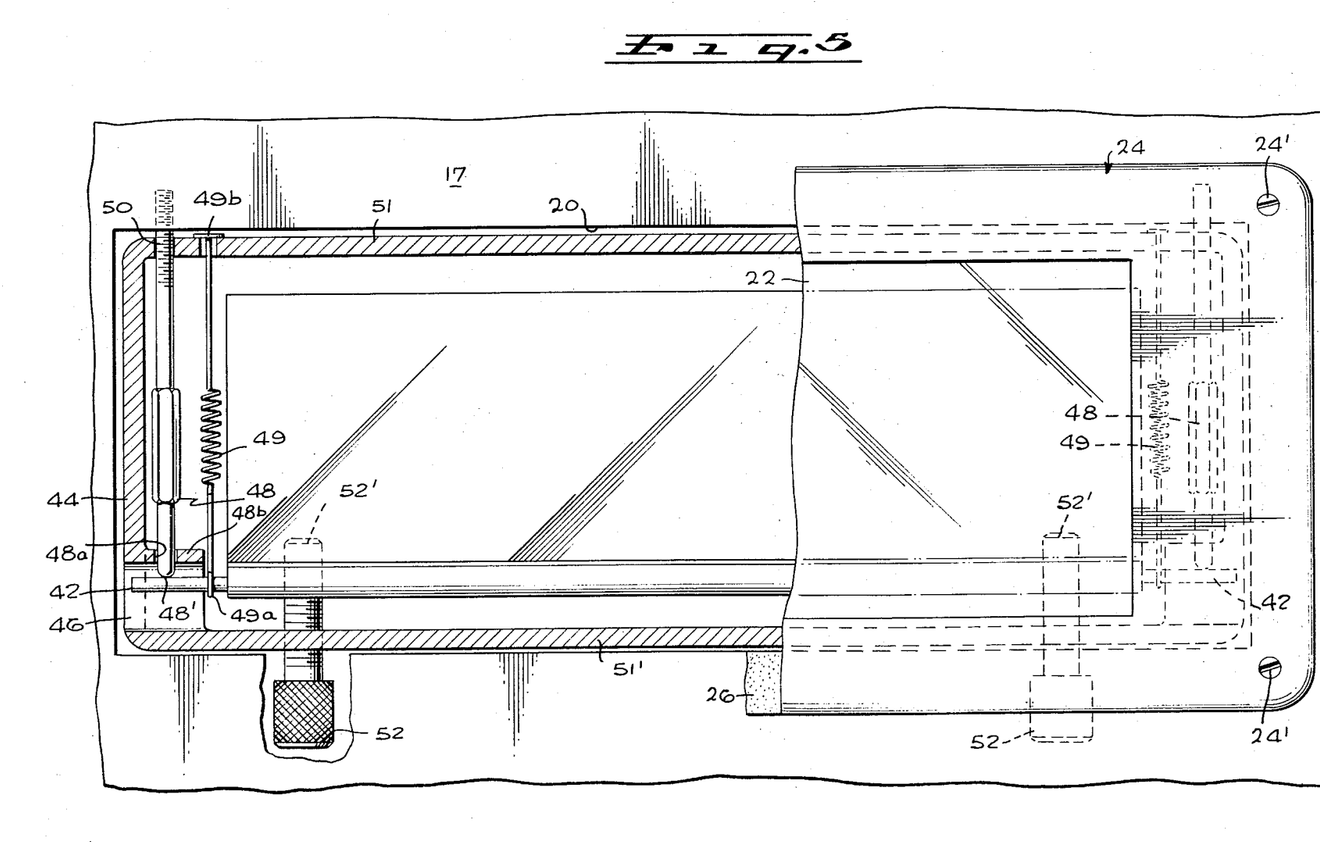
FIG. 5 is an enlarged plan view detail over the driver's roof with a portion of the roof broken away and showing the supporting and adjusting mechanism for the mirror mounted in the auto and depending from the roof structure.

Turning now also to FIG. 2 of the drawing, mirror 10, the conventional plane rear-view mirror, is tilted upward slightly at the driver's option in order to see the larger plane mirror 12 mounted rearwardly of mirror 10, and which faces forward. The surface of mirror 10 makes an angle preferably of about 98° to about 102°, e.g. 99°, to the horizontal, and mirror 12 makes an angle preferably of about 60° to about 70°, e.g. 61°, with the horizontal. Typical sizes of conventional plane mirror 10 are 9.5 × 2 and for planar mirror 12, 19 × 5 inches, although these sizes are understood to be only exemplary. Mirror 14 is mounted above the roof of the auto in an adjustable holding device 18 and consists of a rectangular shaped spherical mirror segment facing the rear of the vehicle and tilted downward slightly so that the tangent to the face of the spherical mirror at the center line thereof, indicated at 19 preferably makes an angle of about 50 to about 60°, e.g. 53°, with the horizontal. As shown in FIGS. 1 and 2, a portion of the roof 17 of the automobile is cut away to form a rectangular opening 20 and a clear glass window 22 is suitably mounted on such opening as by cementing so as to prevent water from entering the vehicle. The roof opening 20 is sealed with a suitable sealing gasket 26 located between a roof mounting 24 for mirror 12, and the roof 17 of the vehicle. Roof mounting 24 is suitably secured to roof 17, e.g. by means of suitable fasteners 24', as seen in FIG. 5.

Figure 3:
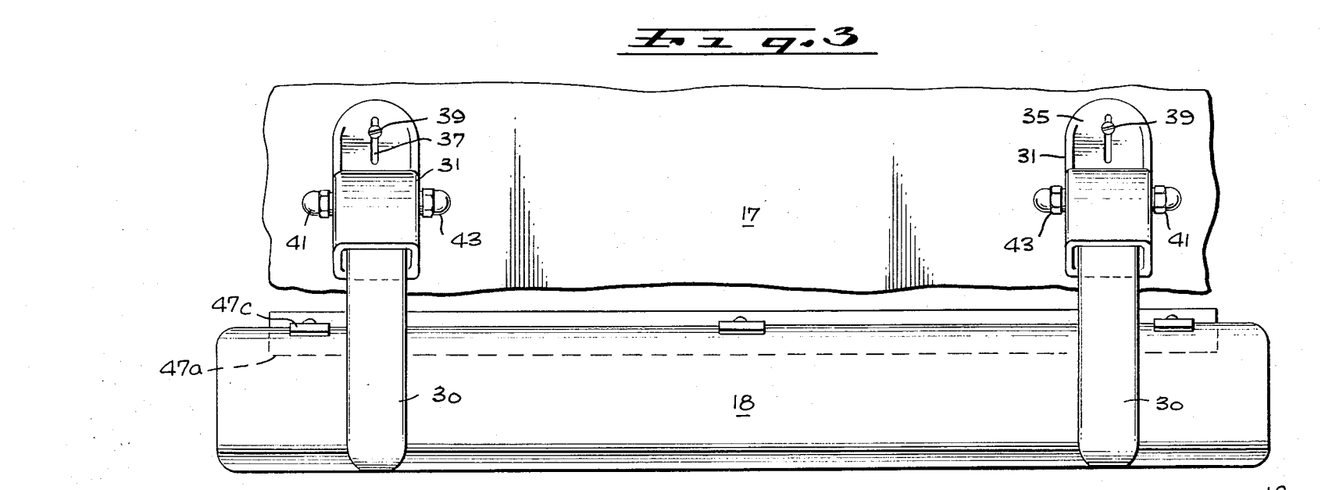
FIG. 3 is a top plan view of the supporting structure for the spherical mirror mounted on the auto roof.
Figure 3A:
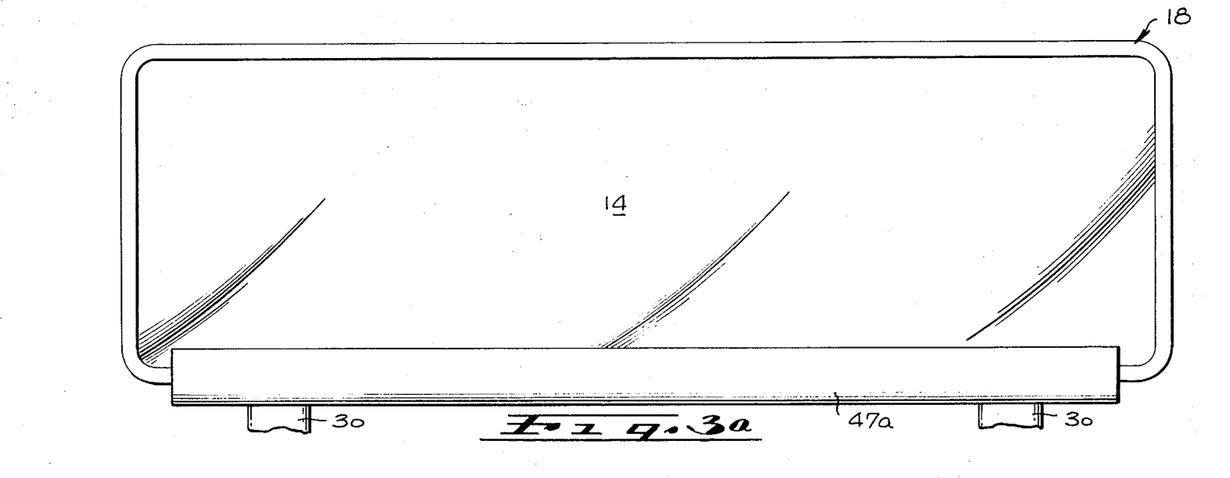
FIG. 3a is a front view of the top mounted spherical mirror, taken on line 3a—3a of FIG. 2.

The spherical mirror surface of the roof mounted mirror 14 can have a spherical radius, e.g. about 28 to 29 inches, and is generally rectangular in external shape, as seen more clearly in FIG. 3a, representing a chord horizontally, e.g. of about 22 inches, and a chord in the other vertical axis of the mirror 14, e.g. of about 7 inches. Thus, mirror 14 is in effect a spherical segment with a rectangular external shape. As will be noted in greater detail below, the view seen by the driver in this spherical mirror permits the driver to see on, above and below the center line straight back from the vehicle, and because of the curved sides and curved mirror surface enables the operator to see into the left and right quarters behind.

To illustrate, mirror 10 can normally be about 22 inches from the driver's eye. Mirror 12, with dimensions noted above, can be about 25 or 26 inches to the rear from mirror 10, and mirror 14 will be located above and slightly forward of mirror 12, and the center lines of mirrors 12 and 14, indicated at 27, can be about 8 or 9 inches apart.

As will be further noted below, mirrors 10, 12 and 14 are all adjustable in varying degrees so that when combined with the dimensional variations of the respective mirrors, the driver is assured of having the desired view fill the mirror 10.

Mirrors 10, 12 and 14 are located essentially on the center line of the vehicle and as is noted in FIG. 2, a portion of the surface of mirror 12 depends into the operator's compartment but does not interfere with the operator shown at 28, since the operator sits to the left of the center line.

Viewing FIGS. 2, 3 and 3a, mirror 14 and its holder or housing 18, in the form of a cross member, are mounted transversely across the vehicle, and are supported on a pair of spaced parallel front brackets 30 extending substantially normal to cross member 18, brackets 30 being suitably connected to the cross member or housing 18 for mirror 14, as by welding or the like. The rectangular shaped spherical mirror 14 can be mounted within a cavity 18' in mirror housing 18 by means of a suitable, e.g. plastic-like, cement, indicated at 14' which can fill or partly fill the cavity 18' behind mirror 14. Brackets 30 extend forward and downwardly at an angle as seen in FIG. 2, and are each connected at their lower ends to a lower bracket 31 mounted on the roof 17 of the vehicle. The brackets 31 are each positioned on a weather sealing pad 33 suitably cemented or attached to the outer surface of roof 17, and the brackets 31 are each provided with a bottom plate 35 in contact with such pad. Bottom plates 35 and pad 33 are each provided with a pair of aligned centrally positioned longitudinal slots 37 and 37', a fastener 39, e.g. in the form of a rivet or screw, being received in such slots, and passing through the plate 35 and pad 33, and connected to the roof 17, for holding brackets 31 in secure position. The slots 37 and 37' permit longitudinal adjustment of the brackets 31 with respect to each other.

Brackets 31 are each provided with a clamping bolt 41 carrying a nut 43 on its end for clamping the forward end of front brackets 30 to each of the respective lower brackets 31, such bolt and nut arrangement functioning as a friction clutch to elevate or lower the upper bracket 30, so as to form any desired tilt angle of mirror 14. Suitable bosses 45 and lock washers 47 are provided to effect a secure locking of the bolt and nut assembly 41,43. The adjustment of the relative longitudinal positions of the adjacent brackets 30 by the adjustable slot and screw arrangements 37,39 and 37', 39, also permits adjustment of mirror 14 to provide any desired small angle of mirror 14 in a horizontal plane, with the center line of the vehicle, if an angle other than 90° to such center line is required for the mirror 14.

Viewing FIGS. 2 and 3, if desired, an elongated upwardly curved flap 47a is provided, which extends transversely of the vehicle below and parallel to the lower edge of mirror 14, leaving a space 47b between the flap and the lower forward edge of mirror holding bracket 30. The flap 47a is suspended from a supporting arm 47c, the upper end of which is suitably connected as by welding, to the bracket 30. Flap 47a serves to deflect moving air up onto the mirror 14 to aid in self cleaning.

Referring to FIG. 2, rear-view mirror 10 is mounted on the windshield 34 of an automobile by means of a bracket 36 which can be cemented as at 38 to the windshield. Mirror 10 is adjustable up or down and horizontally in a conventional manner as by pivotal motion on a swivel indicated at 38' mounted on the inner end of bracket 36.

Viewing FIGS. 2 and 5, plane mirror 12 is cemented as at 38 inches to a backing plate 40 which in turn is suspended from a shaft 42. The ends of shaft 42 are positioned in end members 44 suspended from the roof mounting 24, such end members provided with slots 46 to permit the ends of shaft 42 to move in the horizontal plane but not in the vertical plane. Movement of the ends of shaft 42 in the horizontal plane is controlled by adjustment screws 48, the inner ends of each of such screws passing through a guide bore 48a of an interiorly extending member 48b integrally connected to adjacent end member 44, and abutting at 48' an end portion of mirror shaft 42, which is maintained in contact with the ends 48' of screws 48 by a pair of tension springs 49. Each such spring is positioned adjacent the outer edge portion of mirror 12 and substantially parallel to the adjacent screw 48. One end portion of each spring 49 is extended and looped at 49a around an end portion of shaft 42 adjacent abutting end 48' of screw 48, the other end portion of each spring 49 also being extended and suitably attached at its outer end as at 49b to the forward wall or cross member 51 suspended from the rectangular roof mounting 24. Accordingly, the tension springs 49 tend to urge mirror shaft 42 forward against the ends 48' of adjustment screws 48. The other end of each of screws 48 is threadably engaged at 50 with the cross members 51 of the top mounted frame 24. Thus, by suitably rotating screws 48, either end of the shaft 42 can be moved forward or backward a desired small amount e.g. one-fourth inch, against the action of springs 49, in order to provide angular adjustment of the mirror 12 in the horizontal plane, viewing FIG. 5, so as to bring it into alignment with the cooperating positions of mirrors 10 and 14.

A pair of oppositely positioned adjusting screws 52 are threadably attached through the forward wall 51' of the top mounting assembly 24, the inner ends 52' of which make contact with the rear surface of mirror backing 40. Screws 52 are provided to adjust the tilt angle at which the surface of the mirror plane 12 is suspended from shaft 42, so that by screwing the adjustment screws 52 in a direction to the left, viewing FIG. 2, the mirror will be raised to increase the angle thereof with the horizontal, and by screwing it in the opposite direction, mirror 12 is lowered to decrease the angle of the mirror with the horizontal.

Both the adjusting screws 48 and 52, as shown, are located above the roof liner or upholstery 54 in the automobile, but alternatively can be located in the operator's compartment so that the adjustments of mirror 12 can be made by the operator without disturbing the roof liner or covering. However, it will be understood that as shown, adjusting screws 48 and 52 are normally available to the operator inside the hollow recess 53 formed between the four walls of the top mounted assembly 24, which has an opening 55, and is hollow so as to permit the passage of the light rays from exterior spherical mirror 14 to mirror 12, along the lines indicated at 56, by passage through glass window 22.

The interior roof liner or upholstery 54 can be secured against the sides of the roof-mounted cover or housing 24 at the bottom thereof so as to close the opening around the assembly 24 completely. For this purpose, an arc-like groove 58 can be machined or cast around the bases of the roof-mounted assembly 24 so that a continuous looped spring 60 or similar equivalent means can be employed to press the ends of the roof liner fabric and hold the fabric tight against the sides of the roof-mounted assembly 24, so as to close off any gaps between the roof liner and the roof-mounted assembly.

Materials for the components of the roof mounting assembly 24 can include molded plastics, cast aluminum or die cast metals, which can be suitably plated for decorative purposes, the adjusting screws 48 and 52 being normally made of metal.

Also, the adjustable holding device 18 for mirror 14, including brackets 30 and 31 and the components thereof including the nut and bolt clutch assembly 41,43 can be composed of appropriate metals and may be decoratively plated.

It will be understood from the drawings, that various vehicles may require variations in mirror sizes and relative distances or locations. Thus, for example, the top mount assembly 18 for mirror 14 could be moved forward several inches in which case the roof-mounted assembly 24 would correspondingly be moved forward and the mirror angles involved would change somewhat, but the overall function and purpose of the invention concept would remain the same.

Also, it will be noted that although FIG. 2 of the drawing shows the light rays 56 passing through the top mounted window 22 without refraction, it will be understood that some minor adjustments may be required in the position of the top mounted spherical mirror 14 to account for a few degrees of refraction which would occur as the light passes through the top mounted transparent member 22. Since the amount of adjustment required and the refraction angle are very small, the effect is not illustrated. In any event, the angle of refraction of the light rays passing through the window 22 may for practical purposes be neglected, since the window 22 is generally relatively thin.

Mirror 12 fills or essentially fills the field of view of the conventional adjustable rear-view mirror 10, with the operator's eye position, as illustrated, e.g. approximately 22 inches from mirror 10. Mirror 14 fills or essentially fills the field of view of mirror 12 in such a way that the operator when desiring information about traffic near the left or the right quarter panels, and desiring information at the same time about traffic to the rear, or any combination thereof, can obtain the data in a single image presentation of mirror 10 with no additional energy, or time, or fatigue required over what he would ordinarily have to utilize with the conventional rear-view mirror in the conventional manner. If desired, by tilting mirror 10 downward, the conventional use of the rear-view mirror permits the operator to see a narrower field of view, e.g. of approximately 25°, through the rear window, as is the case in usual present practice.

Figure 6:
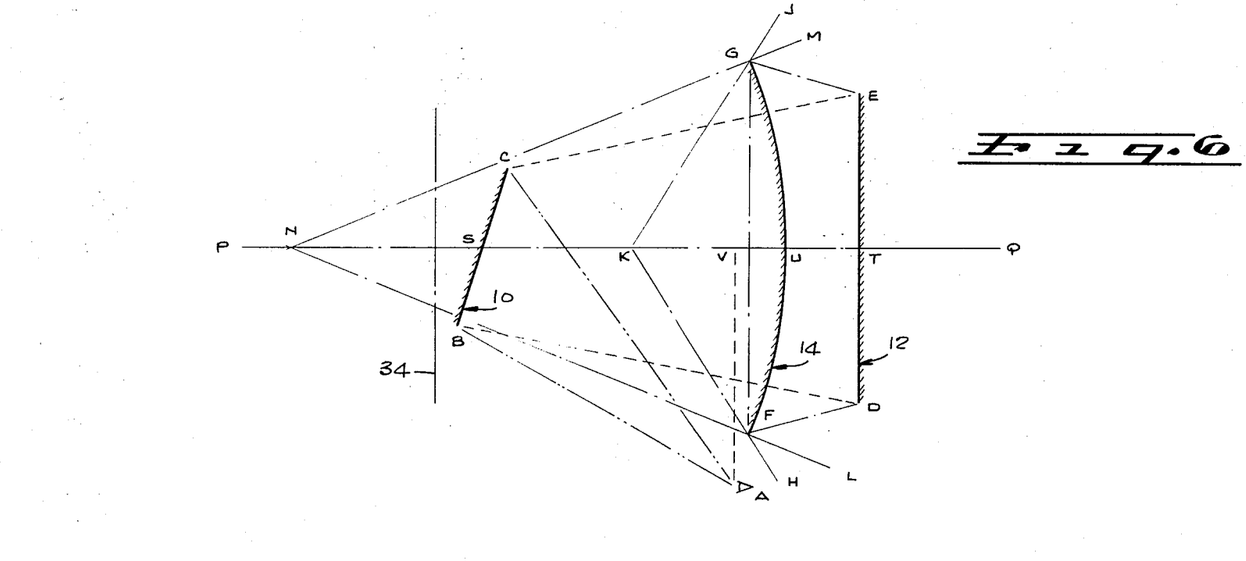
FIG. 6 is a plan view schematic illustration of the rear-view apparatus of the invention, indicating the relative positions of the operator and of the three mirror surfaces.
Figure 7:
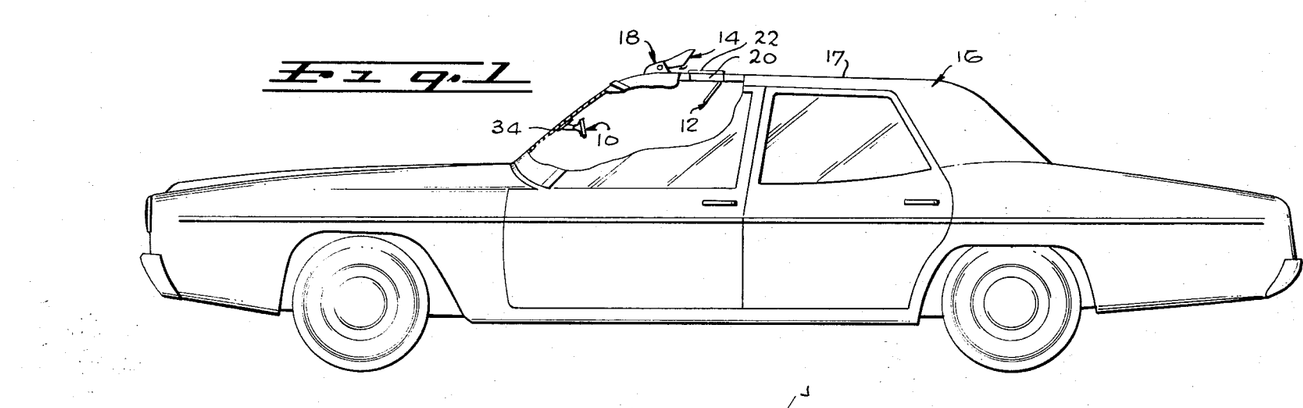

Referring to FIG. 6 of the drawing, this is a plan view schematic illustration of the rear-view device of the invention, illustrating the relative positions of the vehicle operator and of the three mirror surfaces, and showing the angles of refraction of the light rays from the three mirror surfaces. Surface BSC represents the plane adjustable rear-view mirror 10. Surface DTE represents the surface of the plane mirror 12 facing forward, and surface GUF is the spherical mirror 14, facing rearward. The operator's eyes have a locus at A and he has a normal forward view through the windshield indicated by dotted line 34. It will be noted that the driver is positioned to the left of the center line PQ of the automobile and of the respective mirrors 10, 12 and 14.

The operator's normal field of view when seated is between the lines AB and AC into the rear-view mirror BSC (10), and his rear vision is thus confined to the angle included by the two extreme outer rays DB and EC which are reflected from the outer extremities of mirror BSC to form the incident rays AB and AC, respectively. In the case illustrated, the angle formed by the two extreme outer rays DB and EC when extended is 25°, approximately the angle viewed in the rear-view mirror in an ordinary, modern passenger automobile. The mirror surface DTE (12) reflects the view forward again into the rear-viewing spherical mirror GUF (14). This enables the operator at A to see the entire arc or field included in the angle HKJ which in the present instance is 116°. The center of the spherical mirror radial lines LF and MG is at N, on the center line of the automobile, along the line PQ. Centers of the other two mirrors are also on the automobile center line, as noted above, the center of mirror 12 being at T and of mirror 10 at S. Thus, the spherical mirror 14 collects incident light along HF on the left side to JG on the right side and reflects all of the field included between HF and JG back to the operator at A.

The position of point K on center line PQ is determined by extending inward the incident rays HF and JG, whose directions are functions of reflected rays DF and EG, respectively, from mirror 12, and of the radius of curvature FN of spherical mirror 14. Hence, the position of K determines the "field of view angle", HKJ, representing the included view angle of the operator at A, when viewing the field by means of the invention apparatus.

The position of the operator's eye locus at A and of mirror 10 will remain relatively fixed for various positions of mirrors 14 and 12, which may be moved forward or rearward from the position shown, with corresponding changes in the width and height of each, without altering the invention concept. Thus for example the chord GF of the spherical mirror 14 may be located further behind, on, or even ahead of the plane AV, denoting the plane of the operator's eye position, depending on any desired adjustments.

Also, none of the mirrors need be positioned exactly on the center line PQ. Thus, for example mirrors 12 and 14 can be positioned off the center line somewhat, and, if properly aligned, still function in the desired manner. Thus for example by rotating the plane of mirror 10 about the point S so as to increase the angle BSQ by about 10°, the surface of mirrors 12 and 14 would be shifted several inches to the operator's left of the center line PQ.

Also, the radius of curvature of the spherical mirror 14, defined by line FN can be changed somewhat without altering the invention concept. Thus, if the radius FN were longer, the central angle LNM of the spherical mirror 14 would decrease and the angles LFD and EGM would decrease correspondingly. Under these conditions, point K would then be relocated further toward the front of the vehicle (to the left viewing FIG. 6), and the field of view of the operator would correspondingly decrease. Thus, for example, increasing the radius of curvature FN of spherical mirror 14 from 28 inches to 30 inches, would decrease the field angle HKJ from 116° to 108°, which is still highly satisfactory. The radius of curvature of spherical mirror 14 is generally selected, for purposes of the invention, such that the spherical mirror provides a field of view ranging from about 100° to about 120°.

Conversely, if the radius of curvature of spherical mirror 14 were shortened, then the field angle HKJ would be increased. Hence it is clearly apparent that the radius of curvature FN of spherical mirror 14 can be selected to provide a particular field angle HKJ as required by design specifications.

It will be understood that the specific dimensions, distances and angles given in the above description are substantially exemplary, and can vary within the perview of the invention.

From the foregoing, it is seen that the invention provides a relatively simple and economical rear-view mirror apparatus for vehicles, particularly automobiles, to accomplish the main objectives of substantially increasing the field of view of the operator so as to provide a sufficiently wide-angle view to permit the operator to see into the blind spots left and right of the vehicle, with a simple glance at his conventional rear-view mirror, without requiring the operator to swivel his head and eyes back and forth to see the image and hence distracting him from the conditions of the road ahead.

I claim:

1. A rear-view mirror device for a vehicle having a body, a first adjustable substantially plane rear-view mirror mounted within and at the forward end of said body of said vehicle, a second substantially plane mirror spaced from said first mirror and mounted within said body of said vehicle and facing forwardly, said second mirror being positioned so that light rays reflected from said second mirror impinge on said first mirror, a third spherical mirror mounted above said body exteriorly thereof, said spherical mirror facing the rear of said vehicle and being tilted downwardly, means providing an opening in the top of said body, permitting light rays reflected from said third mirror to pass through said opening and to impinge on said second mirror, said first, second and third mirrors being so arranged and of sizes whereby the operator of said vehicle can see at a glance in said first rear-view mirror a wide field of view over the top of said body to the rear thereof.

2. A rear-view mirror device for a vehicle, as defined in claim 1, including means for adjusting the tilt angle of said second mirror with respect to the horizontal, and means for adjusting the tilt angle of said third mirror with respect to the horizontal.

3. A rear-view mirror device as defined in claim 1, including means providing angular adjustment of said second mirror in a horizontal plane and means for providing angular adjustment of said third mirror in a horizontal plane.

4. A rear-view mirror device for a vehicle as defined in claim 1, wherein said spherical mirror is in the form of a spherical segment having a radius of curvature such that said spherical mirror provides a field of view angle ranging from about 100° to about 120°, with the center line of said vehicle approximately bisecting said field of view angle.

5. A rear-view mirror device for a vehicle as defined in claim 1, the sizes of said respective mirrors and their relative positions being such that said second mirror substantially fills the field of view of said first mirror with respect to the position of the eye of the operator, and said third mirror substantially fills the field of view of said second mirror.

6. A rear-view mirror device for a vehicle as defined in claim 1, including means for adjusting the tilt angle of said first mirror with respect to the horizontal and for adjusting the angle of said first mirror in a horizontal plane, means for adjusting the tilt angle of said second mirror with respect to the horizontal, and means for adjusting the tilt angle of said third mirror with respect to the horizontal, means providing angular adjustment of said second mirror in a horizontal plane and means for providing angular adjustment of said third mirror in a horizontal plane, and wherein said third spherical mirror is positioned above and slightly forward of said second mirror.

7. A rear-view mirror device for a vehicle as defined in claim 1, wherein said first, second and third mirrors are progressively larger in area, to thereby fill the field of view in said first mirror.

8. A rear-view mirror device as defined in claim 1, said first, second and third mirrors being mounted approximately on the center line of said vehicle, said device being arranged so that the operator of said vehicle can see in said rear-view mirror an at least 100° wide field of view over the top of said body to the rear thereof including an at least 50° wide view on each side of the center line of said vehicle.

9. A rear-view mirror device for a vehicle as defined in claim 1, wherein said first mirror makes an angle of about 98° to about 102° with the horizontal, said second mirror makes an angle of about 60° to about 70° with the horizontal, and wherein a tangent to the face of said spherical mirror at the horizontal center line thereof makes an angle of about 50° to about 60° with the horizontal.

10. A rear-view mirror device for a vehicle having a body, a top, a front windshield and a rear window, comprising a first adjustable substantially plane rear-view mirror mounted within and at the forward end of said body of said vehicle, a second substantially plane mirror spaced from said first mirror and mounted within said body of said vehicle and facing forwardly, said second mirror being positioned so that light rays reflected from said second mirror impinge on said first mirror, a third spherical mirror mounted over said top of said vehicle exteriorly thereof, said spherical mirror facing the rear of said vehicle and being tilted downwardly, means providing an opening in the top of said vehicle and a transparent window mounted in said opening and permitting light rays reflected from said third mirror to pass through said transparent window and to impinge on said second mirror, said first, second and third mirrors being mounted approximately on the center line of said vehicle and so arranged and of sizes whereby the operator of said vehicle can see at a glance in said first rear-view mirror at least a 100° wide field of view over the top of said vehicle to the rear thereof, including an at least 50° wide view on each side of said center line.

11. A rear-view mirror device for a vehicle, as defined in claim 10, including means for adjusting the tilt angle of said second mirror with respect to the horizontal, means for adjusting the tilt angle of said third mirror with respect to the horizontal, means providing angular adjustment of said second mirror in a horizontal plane and means for providing angular adjustment of said third mirror in a horizontal plane.

12. A rear-view mirror device for a vehicle as defined in claim 10, wherein said spherical mirror is in the form of a spherical segment having a radius of curvature such that said spherical mirror provides a field of view angle ranging from about 100° to about 120°, with the center line of said vehicle approximately bisecting said field of view angle.

13. A rear-view mirror device for a vehicle as defined in claim 12, the sizes of said respective mirrors and their relative positions being such that said second mirror substantially fills the field of view of said first mirror with respect to the position of the eye of the operator, and said third mirror substantially fills the field of view of said second mirror.

14. A rear-view mirror device for a vehicle as defined in claim 10, wherein said third spherical mirror is positioned above and slightly forward of said second mirror, said window being positioned in a substantially horizontal plane between said second and third mirrors, and including means sealing said opening in said top around said window, to prevent dirt and moisture from entering said vehicle.

15. A rear-view mirror device for a vehicle as defined in claim 10, said first rear-view mirror being adjustable to tilt upwardly to a first operative position, whereby said second mirror substantially fills the field of view of said first mirror, and said first mirror is adjustable to tilt downward from said first position to a second position wherein said first mirror is inoperative to provide said at least 100° wide field of view over the top of said vehicle, but is operative to provide a view through said rear window of said vehicle.

16. A rear-view mirror device for a vehicle as defined in claim 10, wherein said first, second and third mirrors are progressively larger in area, to thereby fill the field of view in said first mirror, and wherein said first mirror makes an angle of about 98° to about 102° with the horizontal, said second mirror makes an angle of about 60° to about 70° with the horizontal, and wherein a tangent to the face of said spherical mirror at the horizontal center line thereof makes an angle of about 50° to about 60° with the horizontal.

17. A rear-view mirror device for a vehicle as defined in claim 10, including means for mounting said first mirror on said windshield, means for adjusting the tilt angle of said first mirror with respect to the horizontal and for adjusting the angle of said first mirror in a horizontal plane, means for mounting said second mirror in the body of said vehicle so as to depend from the top of said vehicle into the body of said vehicle above the operator and to his right, including first adjustable screw means for adjusting the vertical angle of said second mirror to the horizontal and a second adjustable screw means to adjust the horizontal angular position of said second mirror with respect to the center line of said vehicle, means mounting said third spherical mirror on the top of said vehicle, said last-mentioned means including an adjustable holding device for said third mirror, said last-mentioned device including cooperating support bracket means and friction clutch means connected to said bracket means, for adjusting the vertical angle of said third mirror to the horizontal, and means for adjusting the horizontal angular position of said third mirror to vary the angle of said third mirror with respect to the center line of said vehicle.

18. A rear-view mirror device for a vehicle as defined in claim 11, wherein said spherical mirror is in the form of a rectangular spherical segment having a radius of curvature such that said spherical mirror provides a field of view angle ranging from about 100° to about 120°, with the center line of said vehicle approximately bisecting said field of view angle, the size of said mirrors and their relative positions being such that said second mirror substantially fills the field of view of said first mirror with respect to the position of the eye of the operator, and said third mirror substantially fills the field of view of said second mirror.

19. A rear-view mirror device for a vehicle as defined in claim 18, wherein said third spherical mirror is positioned above and slightly forward of said second mirror, said window being positioned in a substantially horizontal plane between said second and third mirrors, and including means sealing said opening in said top around said window, to prevent dirt and moisture from entering said vehicle.

20. A rear-view mirror device for a vehicle as defined in claim 19, said first rear-view mirror being adjustable to tilt upwardly to a first operative position, whereby said second mirror substantially fills the field of view of said first mirror, and said first mirror is adjustable to tilt downward from said first position to a second position wherein said first mirror is inoperative to provide said at least 100° wide field of view over the top of said vehicle, but is operative to provide a view through said rear window of said vehicle, and wherein said first, second and third mirrors are progressively larger in area.

21. A rear-view mirror device for a vehicle as defined in claim 10, including means for mounting said first mirror on said windshield, means for mounting said second mirror in the body of said vehicle so as to depend from the top of said vehicle into the body of said vehicle above the operator and to his right, including first adjustable screw means for adjusting the vertical angle of said second mirror to the horizontal and a second adjustable screw means to adjust the horizontal angular position of said second mirror with respect to the center line of said vehicle, means mounting said third spherical mirror on the top of said vehicle, said last-mentioned means including an adjustable holding device for said third mirror, said last-mentioned device including cooperating supporting bracket means and friction clutch means connected to said bracket means, for adjusting the vertical angle of said third mirror to the horizontal, and wherein said first mirror makes an angle of about 98° to about 102° with the horizontal, said second mirror makes an angle of about 60° to about 70° with the horizontal, and wherein a tangent to the face of said spherical mirror at the horizontal center line thereof makes an angle of about 50° to about 60° with the horizontal.

22. A rear-view mirror device for a vehicle as defined in claim 21, including a backing plate for said second mirror, said last-mentioned mirror being cemented to said plate, a shaft connected to said backing plate, a support member connected to the interior of the roof of said vehicle, end members connected to said support member, a horizontal slot in each of said end members, the opposite ends of said shaft being received in said slots, to permit the ends of said shaft to move in a horizontal plane, said first adjustable screw means comprising a first pair of adjustable screws, each of said screws being connected to one end of said shaft and including members for threadably engaging the opposite end of said screws, whereby rotation of said screws permits movement of the ends of said shaft in a horizontal plane to provide angular adjustment of the mirror surface in said plane, said second adjustable screw means comprising a second pair of adjustment screws, means threadably engaging said last-mentioned adjustable screws in said top support member, said last-mentioned screws being in contact with said backing plate of said second mirror, whereby the vertical angle of said second mirror can be adjusted to raise or lower the tilt angle thereof.

23. A rear-view mirror device for a vehicle as defined in claim 22, the ends of said first pair of adjustable screws each abutting said shaft, and including tension spring means connected at one end to said shaft and at the other end to said support member and maintaning said shaft against said ends of said first pair of adjustable screws.

24. A rear-view mirror device for a vehicle as defined in claim 21, said cooperating supporting bracket means for said holding device for said third spherical mirror including a pair of spaced first brackets, said first brackets supporting said spherical mirror at one end thereof, a pair of second spaced brackets, means mounting said second brackets on the top of said vehicle, said friction clutch means comprising a nut and bolt arrangement connecting each of said first brackets to a second bracket, and for adjusting the angular position of said respective first and second brackets, to thereby adjust the vertical tilt angle of said spherical mirror.

25. A rear-view mirror device for a vehicle as defined in claim 24, said means mounting said pair of second spaced brackets on the top of said vehicle including a bottom plate connected to each of said second brackets, slot means in each of said bottom plates, and adjustable fastening means received in said slot means and connected to the top of said vehicle, permitting adjustment of said spherical mirror in the horizontal plane with respect to the center line of said vehicle.

26. A rear-view mirror device for a vehicle as defined in claim 23, said cooperating bracket means for said holding device for said third spherical mirror including a pair of spaced first brackets, said first brackets supporting said spherical mirror at one end thereof, a pair of spaced brackets, means mounting said second brackets on the top of said vehicle, said friction clutch means comprising a nut and bolt arrangement connecting each of said first brackets to a second bracket, and for adjusting the angular position of said respective first and second brackets, to thereby adjust the vertical tilt angle of said spherical mirror, said means mounting said second spaced brackets on the top of said vehicle including a bottom plate connected to each of said second brackets, slot means in each of said bottom plates, and adjustable fastening means received in said slot means and connected to the top of said vehicle, permitting adjustment of said spherical mirror in the horizontal plane with respect to the center line of said vehicle, and wherein said first mirror makes an angle of about 98° to about 102° with the horizontal, said second mirror makes an angle of about 60° to about 70° with the horizontal, and wherein a tangent to the face of said spherical mirror at the horizontal center line thereof makes an angle of about 50° to about 60° with the horizontal.

* * * * *